United States Patent
Chimner et al.

(10) Patent No.: US 8,914,213 B2
(45) Date of Patent: Dec. 16, 2014

(54) METHOD AND APPARATUS FOR REAL TIME ESTIMATION OF ROAD SURFACE FRICTION COEFFICIENT

(71) Applicant: Eaton Corporation, Cleveland, OH (US)

(72) Inventors: Christian Thomas Chimner, Royal Oak, MI (US); John Allen Grogg, LaOtta, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/979,996

(22) PCT Filed: Mar. 12, 2013

(86) PCT No.: PCT/US2013/030488
§ 371 (c)(1),
(2), (4) Date: Jul. 16, 2013

(87) PCT Pub. No.: WO2013/158252
PCT Pub. Date: Oct. 24, 2013

(65) Prior Publication Data
US 2014/0114547 A1 Apr. 24, 2014

Related U.S. Application Data

(60) Provisional application No. 61/635,122, filed on Apr. 18, 2012, provisional application No. 61/649,434, filed on May 21, 2012.

(51) Int. Cl.
*B60W 30/02* (2012.01)
*B60W 40/068* (2012.01)
*B60T 8/172* (2006.01)
*B60W 50/00* (2006.01)

(52) U.S. Cl.
CPC .............. *B60W 40/068* (2013.01); *B60T 8/172* (2013.01); *B60W 2540/18* (2013.01);
(Continued)

(58) Field of Classification Search
CPC ... B60T 2210/12; B60W 40/068; B62D 6/006
USPC ........................................................ 701/71, 73
See application file for complete search history.

(56) References Cited

U.S. PATENT DOCUMENTS

| | | | |
|---|---|---|---|
| 5,513,907 | A | 5/1996 | Kiencke et al. |
| 5,862,503 | A | 1/1999 | Eckert et al. |

(Continued)

FOREIGN PATENT DOCUMENTS

| | | |
|---|---|---|
| EP | 2147842 A1 | 1/2010 |
| GB | 2435102 | 8/2007 |

(Continued)

OTHER PUBLICATIONS

Liu, Chia-Shang; Peng, Huei. "Road Friction Coefficient Estimation for Vehicle Path Prediction", Vehicle System Dynamics, vol. 25 Supplement, 1996, pp. 413-425.*

(Continued)

*Primary Examiner* — John Q Nguyen
*Assistant Examiner* — Anshul Sood
(74) *Attorney, Agent, or Firm* — Mei & Mark LLP

(57) ABSTRACT

A computer program product, a method and an apparatus for detection of road surface friction coefficient for vehicle stability control are disclosed. The computer program product comprises stored instructions for receiving detected vehicle parameters from a vehicle; calculating a lookup value based on the detected vehicle parameters, the calculating comprising an recursive least square estimation; retrieving a road surface friction coefficient from a lookup table by matching the calculated lookup value to the road surface friction coefficient stored in the lookup table; calculating adjustments to the vehicle using the road surface friction coefficient; and outputting the adjustments to a vehicle control system for execution.

22 Claims, 7 Drawing Sheets

(52) U.S. Cl.
CPC ......... *B60T 2210/12* (2013.01); *B60W 2520/14* (2013.01); *B60W 2050/0026* (2013.01); *B60W 2520/20* (2013.01); B60W 30/02 (2013.01); *B60W 2520/125* (2013.01)
USPC .............................................. 701/73; 701/71

(56) References Cited

U.S. PATENT DOCUMENTS

| | | | |
|---|---|---|---|
| 5,869,753 | A | 2/1999 | Asanuma et al. |
| 2002/0002437 | A1 | 1/2002 | Matsuno |
| 2003/0051544 | A1* | 3/2003 | Hong .............................. 73/146 |
| 2006/0041365 | A1 | 2/2006 | Mori |
| 2010/0131146 | A1 | 5/2010 | Nardi et al. |
| 2010/0131229 | A1* | 5/2010 | Nardi et al. ................... 702/142 |
| 2011/0015906 | A1 | 1/2011 | Bian et al. |
| 2011/0125455 | A1* | 5/2011 | Nardi et al. ................... 702/142 |
| 2012/0025600 | A1* | 2/2012 | Cabrera Carrillo et al. .... 701/80 |

FOREIGN PATENT DOCUMENTS

| | | |
|---|---|---|
| JP | 08156627 | 6/1996 |
| JP | 11115721 | 4/1999 |
| JP | 2002173044 | 6/2002 |
| JP | 201256365 A | 3/2012 |
| WO | 2008133150 A1 | 11/2008 |

OTHER PUBLICATIONS

Wakamatsu, Kiyoshi; Akuta, Yoshimitsu; Ikegaya, Manabu; Asanuma, Nobuyoshi. "Adaptive Yaw Rate Feedback 4WS with Tire/Road Friction Coefficient Estimator", Vehicle System Dynamics, vol. 27, 1997, pp. 305-326.*

* cited by examiner

US 8,914,213 B2

METHOD AND APPARATUS FOR REAL TIME ESTIMATION OF ROAD SURFACE FRICTION COEFFICIENT

PRIORITY

This application claims the benefit of priority to U.S. provisional application 61/649,434, filed May 21, 2012 and U.S. provisional application 61/635,122 filed Apr. 18, 2012, both incorporated herein by reference in their entireties.

TECHNICAL FIELD

The disclosure relates to a method and an apparatus for real time estimation of the road surface friction coefficient for vehicle stability control.

BACKGROUND

The road surface friction coefficient $\mu$ is a time varying characteristic that can deviate widely in a short time, especially for a vehicle running at a high speed. In order to optimize a vehicle stability control system, it is desirable to know the road surface friction coefficient $\mu$ during vehicle operation. Using this information the control system can change yaw control parameters for different types of road surfaces (asphalt, gravel, snow, ice, and etc.) to help optimize the stability control system response. Currently there is no method to directly measure the coefficient $\mu$; it therefore must be estimated by the control system using sensor information that is available on a vehicle.

SUMMARY

The present disclosure provides a computer program product, a method and an apparatus for accurately estimating the road surface friction coefficient, in real time for vehicle stability control. A computer program product comprises programming stored on a memory device. The programming is configured for processing by a processor. The programming comprising instructions to receive detected vehicle parameters from a vehicle, calculate a lookup value based on the detected vehicle parameters, the calculating comprising a recursive least square estimation, retrieve a road surface friction coefficient from a lookup table by matching the calculated lookup value to the road surface friction coefficient stored in the lookup table, calculate adjustments to the vehicle using the road surface friction coefficient, and output the adjustments to a vehicle control system for execution.

The lookup value can be the partial derivative of the measured yaw rate over an estimated yaw rate or the partial derivative of the normalized lateral forces on the front and rear tires over the vehicle steer angle.

An apparatus for estimation of a road surface friction coefficient for vehicle stability control comprises a vehicle stability control system comprising actuators, sensors for detecting vehicle parameters, at least one memory device storing programming for estimating a road surface friction coefficient. The programming comprises processor-executable instructions to calculate a lookup value based on the vehicle parameters and an recursive least square estimation, retrieve a road surface friction coefficient from a stored lookup table by matching the calculated lookup value to the road surface friction coefficient, calculate adjustments to the vehicle using the road surface friction coefficient, and output the adjustments to the vehicle control system for implementation. At least one processor is in communication with the sensors and the at least one memory device. The at least one processor is configured to receive and execute the instructions, and receive the detected vehicle parameters.

The lookup value calculated by the aforementioned apparatus can be the partial derivative of the measured yaw rate over an estimated yaw rate or the partial derivative of the normalized lateral forces on the front and rear tires over the vehicle steer angle.

With the above method and apparatus, the road surface friction coefficient can be accurately estimated in real time.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and together with the description, serve to explain the principles of the disclosed algorithm.

DETAILED DESCRIPTION

Reference will now be made in detail to the present exemplary embodiments, examples of which are illustrated in the accompanying drawings.

For many reasons, vehicles such as minivans, SUVs, sedans, pick-up, trucks, etc. are electronically monitored and controlled for such things as anti-lock braking, anti-rollover, skid control, fuel economy, etc. All wheel drive (AWD), rear wheel drive (RWD) and front wheel drive (FWD) can have traction and or stability control systems that can be dynamically altered by controlling one or both of the brake-based system or the torque distribution of the active driveline system. Many hardware arrangements exist for the sensors and controls.

Data for the monitoring and controlling can be collected and used to calculate other data, which can include backing out hard to measure data. Absolute accurate detection of the road surface friction coefficient ($\mu$) remains difficult in real time. We propose gain scheduling in lieu of direct measurements of $\mu$. An ordered algorithm looks over collected data to estimate $\mu$ in real time. The proposed technique can avoid over-reliance on pre-programmed data and/or data that is no longer relevant because of a change in road surface.

The real-time μ estimate can be used, for example, for traction control when the vehicle is experiencing slippage or split μ conditions. The estimate can be used for ABS (antilock brake system) control of brake pressure or torque control of wheel speeds. As another example, the estimate can be used for yaw stability control such as oversteering or understeering correction via brake forces or torque control.

The method carefully looks over collected data and applies statistical measures for use in the decision making process. In this way, μ is detected in real time using more than mere data extraction or mathematical "backing out."

Figure 1:
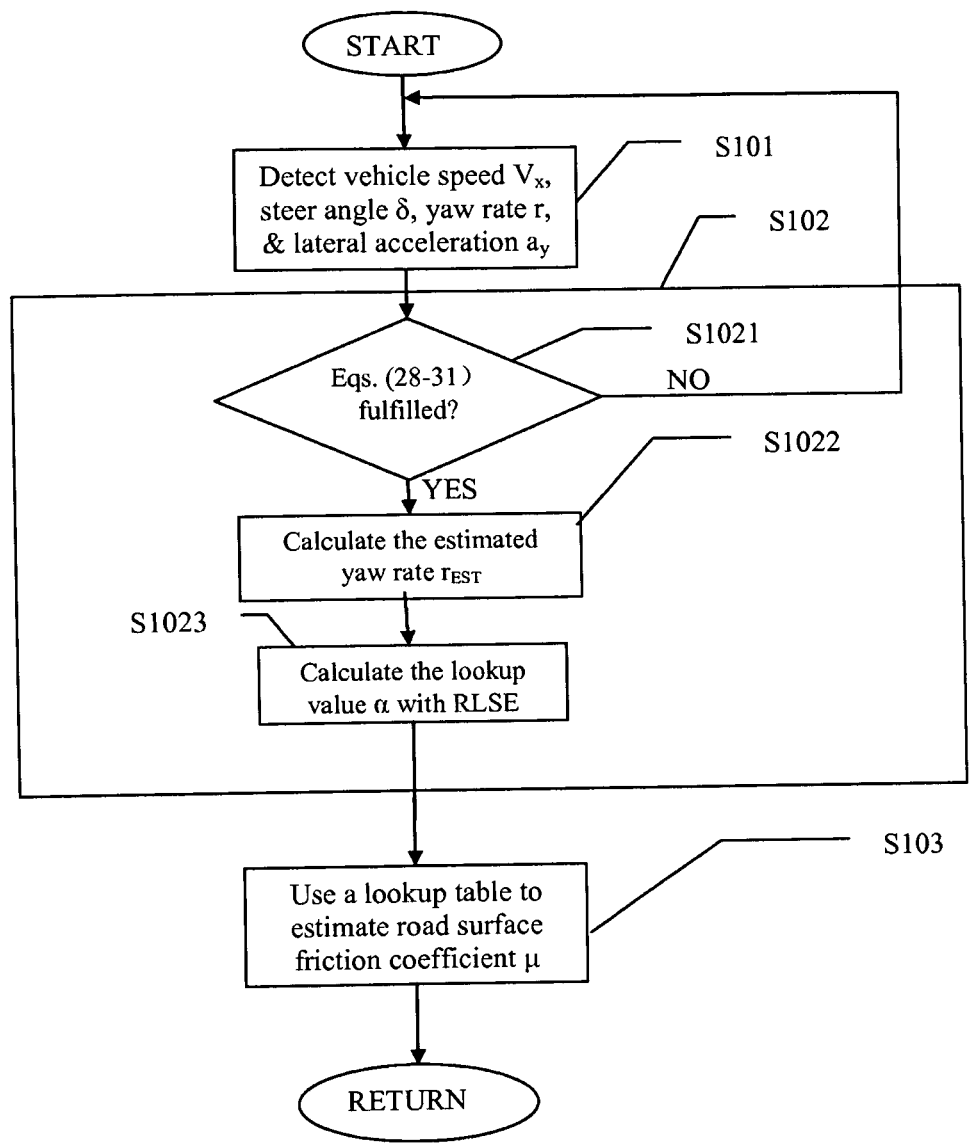
FIG. 1 illustrates a method for real time estimation of road surface friction coefficient for vehicle stability control.

FIG. 1 illustrates a method for real time estimation of road surface friction coefficient for vehicle stability control. The method comprises steps S101, S102, and S103. As shown in FIG. 1, at step S101, a number of exemplary vehicle parameters (namely the vehicle speed $V_x$, vehicle steer angle δ, and yaw rate r) are detected, preferably in real time by appropriate vehicle sensors.

Next, at step S102, the detected parameters are used to calculate a lookup value α. The value α is defined as the partial derivative of the measured yaw rate over an estimated yaw rate:

$$\alpha = \frac{\partial r_{MEAS}}{\partial r_{EST}} \qquad \text{eq. (1)}$$

where $r_{MEAS}$ stands for the measured yaw rate, and $r_{EST}$ stands for the estimated yaw rate, which is calculated using the following:

$$r_{EST} = V_x \delta \bigg/ \left( L + \frac{k_{us} V_x^2}{g} \right) \qquad \text{eq. (2)}$$

where $V_x$ is the vehicle speed, δ is the vehicle steer angle, L is the wheelbase length, $k_{us}$ is the vehicle understeer gradient, and g is the gravitational constant. The understeer gradient $k_{us}$ is a predetermined parameter, which is chosen during calibration so that the model gives an accurate prediction for vehicle yaw rate during operation of the vehicle.

If the vehicle is driving on a high μ surface, the lookup value α will be approximately equal to 1. For surfaces with lower μ, the vehicle will begin to understeer while cornering causing α to be less than 1. Thus, the lower the friction coefficient the lower α will become.

The final step, S103, uses a lookup table to estimate μ from α. The lookup table is prepared experimentally beforehand based on the relationship between μ and α.

To make an accurate prediction of α, the step S102 uses a recursive least square estimation (RLSE) scheme. There are different derivations and representations for RLSE. Below is one of them, written in matrix notation.

Suppose we are estimating a n-dimensional vector x with the input information of a vector y and a matrix A, which obey the follow relation $$y = Ax + \varepsilon \qquad \text{eq. (3)}$$

$$\begin{bmatrix} y_1 \\ \vdots \\ y_m \end{bmatrix} = \begin{bmatrix} a_{11} & \cdots & a_{1n} \\ \vdots & \ddots & \vdots \\ a_{m1} & \cdots & a_{mn} \end{bmatrix} \begin{bmatrix} x_1 \\ \vdots \\ x_n \end{bmatrix} + \begin{bmatrix} \varepsilon_1 \\ \vdots \\ \varepsilon_m \end{bmatrix}$$

where ε is a random variable vector (error) accounting for the discrepancy between the actually observed y and the predicted outcomes Ax, $y_i$ stands for the entries of the vector y, $a_{ij}$ stands for the entries of the matrix A, and $\epsilon_i$ denotes the entries of the vector ε. From equation (3) we can generate the following least square (LS) estimate:

$$\hat{x}(m) = (A'QA)^{-1} A'Qy = P_m A'Qy$$

$$P_m = (A'QA)^{-1} \qquad \text{eq. (4-5)}$$

that minimizes the weighted LS estimation cost function $J_m = (y-Ax)'Q(y-Ax)$, in which Q is a m×m dimension weight matrix, and $P_m$ is the estimation error covariance matrix. Next, suppose that a new update information $$y_{m+1} = [a_{(m+1)1} \ \cdots \ a_{(m+1)n}] \begin{bmatrix} x_1 \\ \vdots \\ x_n \end{bmatrix} + \varepsilon_{m+1} = H_{m+1} x + \varepsilon_{m+1} \qquad \text{eq. (6-7)}$$

$$H_{m+1} = [a_{(m+1)1} \ \cdots \ a_{(m+1)n}]$$

comes along, in which the scalar $y_{m+1}$ and the intermediate row vector $H_{m+1}$ represent the update information. Since the augmented information becomes $$\begin{bmatrix} A \\ H_{m+1} \end{bmatrix} x + \begin{bmatrix} \varepsilon \\ \varepsilon_{m+1} \end{bmatrix} = \begin{bmatrix} y \\ y_{m+1} \end{bmatrix} \qquad \text{eq. (8)}$$

A new LS estimate can be computed accordingly as $$\hat{x}(m+1) = \left( [A' \ H'_{m+1}] \begin{bmatrix} Q & 0 \\ 0 & q_{m+1} \end{bmatrix} \begin{bmatrix} A \\ H_{m+1} \end{bmatrix} \right)^{-1} \qquad \text{eq. (9)}$$

$$[A' \ H'_{m+1}] \begin{bmatrix} Q & 0 \\ 0 & q_{m+1} \end{bmatrix} \begin{bmatrix} y \\ y_{m+1} \end{bmatrix}$$

$$= \begin{bmatrix} A'QA + \\ H'_{m+1} q_{m+1} H_{m+1} \end{bmatrix}^{-1} \begin{bmatrix} A'QY + \\ H'_{m+1} q_{m+1} y_{m+1} \end{bmatrix}$$

in which $q_{m+1}$ is the weight used for the update information of the scalar $y_{m+1}$ and the intermediate row vector $H_{m+1}$. In order to minimize the cost function $$J_{m+1} = \left( \begin{bmatrix} y \\ y_{m+1} \end{bmatrix} - \begin{bmatrix} A \\ H_{m+1} \end{bmatrix} x \right)' \begin{bmatrix} Q & 0 \\ 0 & q_{m+1} \end{bmatrix} \left( \begin{bmatrix} y \\ y_{m+1} \end{bmatrix} - \begin{bmatrix} A \\ H_{m+1} \end{bmatrix} x \right) = \qquad \text{eq. (10)}$$

$$(y - Ax)'Q(y - Ax) + (y_{m+1} - H_{m+1}x)' q_{m+1} (y_{m+1} - H_{m+1}x)$$

equation (9) can be transformed, under the Matrix Inversion Lemma (which says that $$(A + BCD)^{-1} = A^{-1} - A^{-1} B \begin{pmatrix} C^{-1} + \\ DA^{-1} B \end{pmatrix}^{-1} DA^{-1} \text{) into: } \hat{x}(m+1) = \qquad \text{eq. (11)}$$

$$\begin{bmatrix} A'QA + \\ H'_{m+1} q_{m+1} H_{m+1} \end{bmatrix}^{-1} \begin{bmatrix} A'QY + \\ H'_{m+1} q_{m+1} y_{m+1} \end{bmatrix} =$$

-continued $$\hat{x}(m) + P_m H'_{m+1} \begin{pmatrix} q'_{m+1} + \\ H_{m+1} P_m H'_{m+1} \end{pmatrix}^{-1} \begin{pmatrix} y_{m+1} - \\ H_{m+1} \hat{x}(m) \end{pmatrix}$$

where the estimation error covariance matrix $$P_{m+1} = \left( [A' \ H'_{m+1}] \begin{bmatrix} Q & 0 \\ 0 & q_{m+1} \end{bmatrix} \begin{bmatrix} A \\ H_{m+1} \end{bmatrix} \right)^{-1} = \quad \text{eq. (12)}$$

$$P_m - P_m H'_{m+1}(H_{m+1} P_m H'_{m+1} + q_{m+1}^{-1})^{-1} H_{m+1}(A'QA)^{-1}$$

Equations (11) and (12) lead to the following RLSE scheme:

$$\hat{x}(m+1) = \hat{x}(m) + K_{m+1}(y_{m+1} - H_{m+1}\hat{x}(m))$$

$$H_{m+1} = [a_{(m+1)1} \ldots a_{(m+1)n}]$$

$$K_{m+1} = P_m H'_{m+1}(H_{m+1} P_m H'_{m+1} + q_{m+1}^{-1})^{-1}$$

$$P_{m+1} = [I_n - K_{m+1} H_{m+1}]P_m \quad \text{eqs. (13-16)}$$

where $I_n$ is a n-dimensional unit matrix, $H_m$ is an intermediate row vector at time m, $K_m$ is the estimator gain matrix at time m, and $P_m$ is the estimation error covariance matrix at time m.

Further, the above RLSE scheme can be reduced into one with an exponential forgetting factor, so that the estimation slowly forgets older errors (data). To do so, set the weight matrix Q as the following $$Q = \begin{bmatrix} \lambda^{m-1} & & & \\ & \ddots & & \\ & & \lambda & \\ & & & 1 \end{bmatrix} \quad \text{eq. (17)}$$

in which $\lambda$ is the exponential forgetting factor ($\lambda<1$). With the above weight matrix, the cost function of equation (10) and the estimation scheme demonstrated in equations (13-16) are respectively reduced to $$J_{m+1} = \frac{1}{2}[\varepsilon_1 \ldots \varepsilon_{m-1} \ \varepsilon_m] \begin{bmatrix} \lambda^{m-1} & & & \\ & \ddots & & \\ & & \lambda & \\ & & & 1 \end{bmatrix} \begin{bmatrix} \varepsilon_1 \\ \vdots \\ \varepsilon_{m-1} \\ \varepsilon_m^* \end{bmatrix} = \quad \text{eq. (18)}$$

$$\frac{1}{2}(\lambda^{m-1}\varepsilon_1^2 + \ldots + \lambda\varepsilon_{m-1}^2 + \varepsilon_m^2)$$

$$\hat{x}(m+1) = \hat{x}(m) + K_{m+1}(y_{m+1} - H_{m+1}\hat{x}(m)) \quad \text{eqs. (19-22)}$$

$$H_{m+1} = [a_{(m+1)1} \ldots a_{(m+1)n}]$$

$$K_{m+1} = P_m H'_{m+1}(H_{m+1} P_m H'_{m+1} + \lambda)^{-1}$$

$$P_{m+1} = \frac{1}{\lambda}[I_n - K_{m+1} H_{m+1}]P_m$$

Equations (13-16) and (19-22) are a general representation for RLSE. Applying the general representation to estimate a α defined by equation (1) reduces equations (3) and eqs. (19-22) into:

$$\begin{bmatrix} r_{MEAS,1} \\ \vdots \\ r_{MEAS,m} \end{bmatrix} = \begin{bmatrix} r_{EST,1} & 1 \\ \vdots & \vdots \\ r_{EST,m} & 1 \end{bmatrix} \begin{bmatrix} \alpha \\ c \end{bmatrix} + \begin{bmatrix} \varepsilon_1 \\ \vdots \\ \varepsilon_m \end{bmatrix} \quad \text{eq. (23)}$$

$$\alpha(m+1) = [1 \ 0] \cdot (\hat{\alpha}(m) + K_{m+1}(r_{MEAS,m+1} - H_{m+1}\hat{\alpha}(m))) \quad \text{eqs. (24-27)}$$

$$H_{m+1} = [r_{EST,m+1} \ 1]$$

$$K_{m+1} = P_m H'_{m+1}(H_{m+1} P_m H'_{m+1} + \lambda)^{-1}$$

$$P_{m+1} = \frac{1}{\lambda}[I_n - K_{m+1} H_{m+1}]P_m$$

In the above equations, $\alpha(m)$ represents the estimated scalar α at time m, c is a certain constant, $r_{MEAS,m}$ denotes the yaw rate measured at time m, $r_{EST,m}$ denotes the yaw rate estimated at time m, $\hat{\alpha}(m)$ represents an intermediate vector (i.e., $[\alpha \ c]'$) at time m, $H_m$ is an intermediate row vector at time m, $K_m$ is the estimator gain matrix at time m, and $P_m$ is the estimation error covariance matrix at time m.

In an exemplary implementation of the developed logic, the offset is assumed to be equal to zero such that the steering angle input is zero and equal to the vehicle yaw rate which is zero. In this implementation, c=0 and it can be removed from the equation (23).

Equations (24-27) demonstrated that $\alpha(m)$, the estimated α at time m, can be estimated through $r_{MEAS,m}$, the yaw rates measured at time m. The method is recursive, taking the Measured yaw rate at previous time (i.e., at time 1, 2, . . . , and (m−1)) into account; in other words, the method takes previous information $r_{MEAS,m}$, $r_{MEAS,2}$, . . . , and $r_{MEAS,m-1}$ into account.

In the meanwhile, the older the information of $r_{MEAS}$ is, the less influence it has over the estimation of α due to the exponential forgetting factor $\lambda$. The value of the exponential forgetting factor $\lambda$ is less than 1, and can be adjusted depending on how fast the information of $r_{MEAS}$ should be forgotten. For example, when $r_{MEAS}$ changes dramatically between time m and m+1 due to a terrain change, $\lambda$ can be adjusted to forget $r_{MEAS}$ faster than when values of $r_{MEAS}$ between time m and m+1 are within a narrow range. Therefore the estimation can also include programming to compare values of $r_{MEAS}$ over time.

Preferably, to improve the overall stability of the estimation, the RLSE calculation is only enabled when the following criteria are met:

$$V_{x,MIN} \leq V_x \leq V_{x,MAX}$$

$$\delta_{MIN} \leq \delta \leq \delta_{MAX}$$

$$r_{MIN} \leq r_{MEAS} \leq r_{MAX}$$

$$a_{y,MIN} \leq a_y \leq a_{y,MAX} \quad \text{eqs. (28-31)}$$

in which $V_{x,MIN}$ and $V_{x,MAX}$ are predetermined minimum and maximum values of vehicle speed $V_x$; $\delta_{MIN}$ and $\delta_{MAX}$ are predetermined minimum and maximum values for steer angle $\delta$, $r_{MIN}$ and $r_{MAX}$ are predetermined minimum and maximum values of yaw rate r; and $a_{y,MIN}$ and $a_{y,MAX}$ are predetermined minimum and maximum values of the lateral acceleration. Equations (28-31) help to ensure that the tires are operating in the linear range and that the vehicle is sufficiently excited to estimate α.

Referring to FIG. 1 again, to assure optimal operation, that the RLSE estimation is only enabled when the criteria of equations (28-31) are met, the step S102 is implemented through a plurality of sub-steps. At sub-step S1021, it is checked whether the vehicle speed $V_x$, the vehicle steer angle $\delta$, the measured yaw rate $r_{MEAS}$, and lateral acceleration $a_y$ fulfill equations (28-31). If equations (28-31) are fulfilled, the method proceeds with the sub-step S1022; otherwise, the method goes back and starts again at the step S101. At sub-step S1022 the estimated yaw rate $r_{EST}$ is calculated with the detected vehicle speed $V_x$ and vehicle steer angle δ according to equation (2). At sub-step S1023, the lookup value α is calculated with RLSE.

Figure 2:
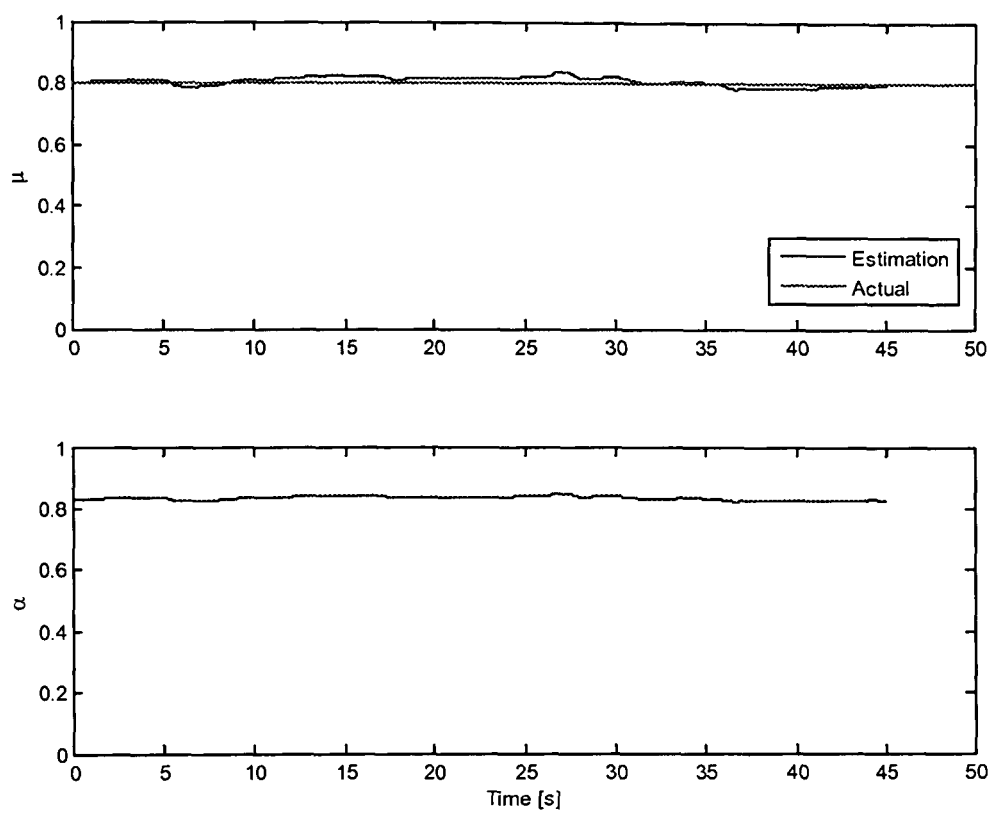
FIG. 2 shows the estimated values of $\mu$ and $\alpha$ for a vehicle operating on a high $\mu$ (asphalt)
Figure 3:
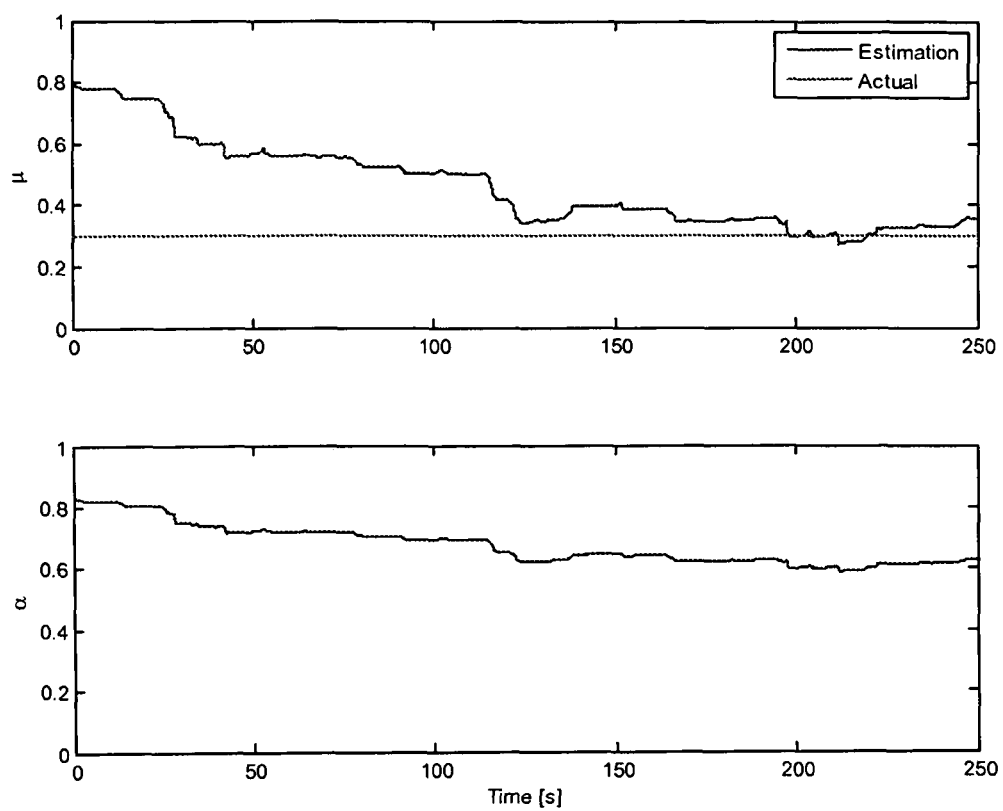
FIG. 3 shows the estimated values of $\mu$ and $\alpha$ for the same vehicle as that of FIG. 2, which, however, operates on a low $\mu$ (snow) surface instead on a high $\mu$ surface.

The estimated values of α and μ for the same vehicle operating on both a high μ (asphalt) and a low μ (snow) surface are respectively shown in FIGS. 2 and 3. During testing on a high μ surface (FIG. 2), α is near to 1 since the vehicle model and measured yaw rate are correlating well. The actual and estimated μ are very close, and α is very close to μ. On the low μ surface (FIG. 3), α≈0.6 due to the lower tire/road surface friction which causes the vehicle to understeer while cornering. The recursive nature of the estimation allows α to quickly adjust towards an accurate correlator for μ. Because the recursive logic uses less memory than a batch type analysis, and because the equations are not computationally demanding to solve, μ is very well estimated within a reasonable time. In the above example, μ is very well estimated within 125 seconds.

Figure 4:
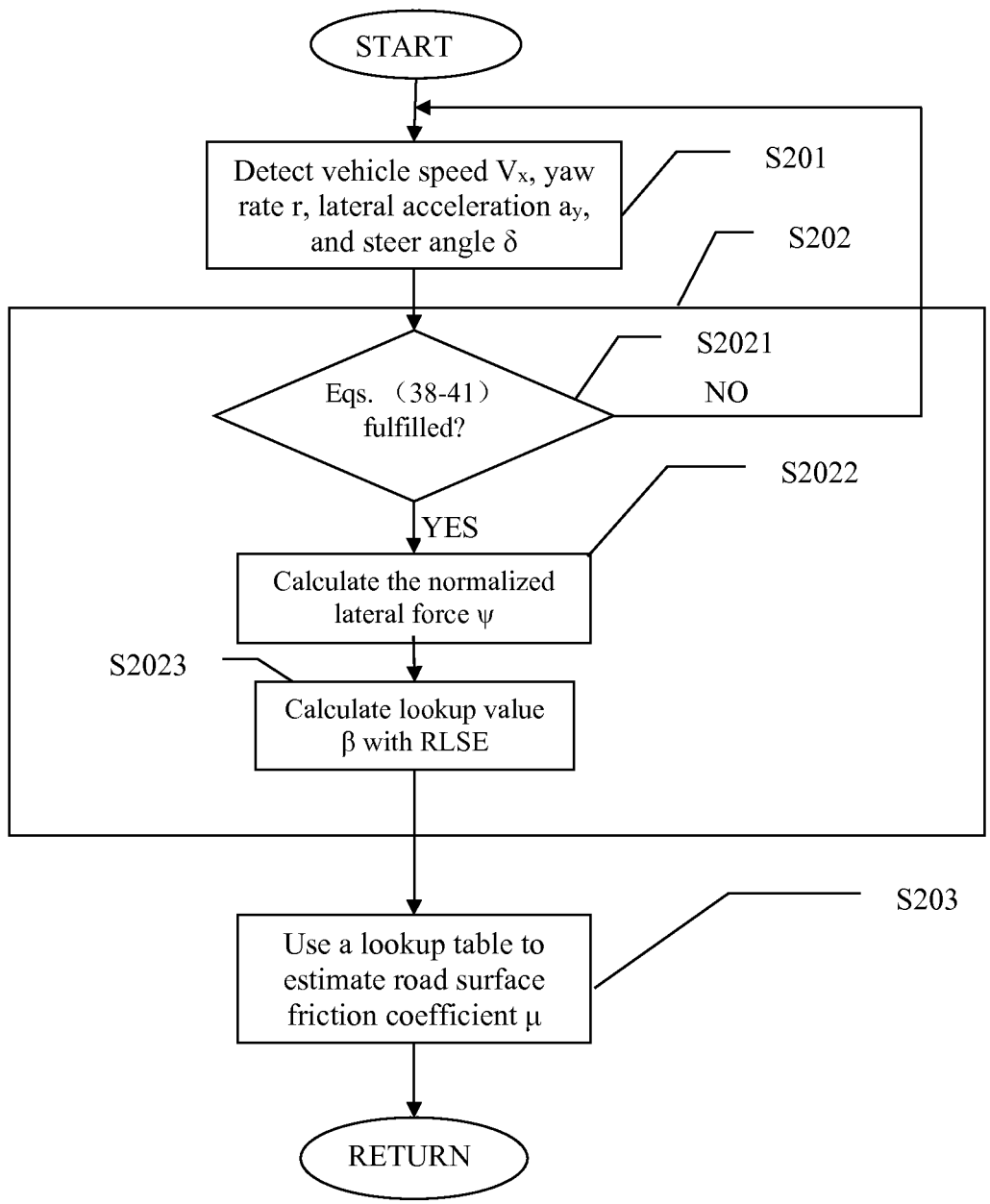
FIG. 4 illustrates another method for real time estimation of road surface friction coefficient for vehicle stability control.

FIG. 4 illustrates another method for real time estimation of road surface friction coefficient for vehicle stability control. The method comprises steps S201, S202, and S203. As shown in FIG. 4, at step S201, a number of vehicle parameters, namely the vehicle speed $V_x$, yaw rate r, vehicle steer angle δ, and lateral acceleration $α_y$, are detected, preferably in real time by appropriate vehicle sensors.

Next, at step S202, a lookup value β is calculated with the detected values. β is defined as the partial derivative of the normalized lateral forces on the front and rear tires over the vehicle steer angle, i.e.

$$\beta = \frac{\partial \psi}{\partial \delta} \qquad \text{eq. (32)}$$

where ψ is the normalized lateral forces $$\psi = \frac{F_f + F_r}{V_x} = \frac{ma_y + V_x mr}{V_x} \qquad \text{eq. (33)}$$

where $V_x$ is the vehicle speed, $a_y$ is the lateral acceleration of the vehicle, m is the mass of the vehicle, r is the vehicle yaw rate, $F_f$ is the front tire lateral force, and $F_r$ is the rear tire lateral force.

If the vehicle is driving on a high μ surface, β will be larger. For surfaces with lower μ, the vehicle will not be able to generate as much lateral force at the tires. Thus, the lower the friction coefficient, the lower β will become.

Similar to the above, β can be estimated with a RLSE scheme:

$$\beta(m+1) = [1\ 0] \cdot (\hat{\beta}(m) + K_{m+1}(\psi_{m+1} - H_{m+1}\hat{\beta}(m))) \qquad \text{eq. (34-37)}$$

$$H_{m+1} = [\delta_{m+1}\ 1]$$

$$K_{m+1} = P_m H'_{m+1}(H_{m+1} P_m H'_{m+1} + \lambda)^{-1}$$

$$P_{m+1} = \frac{1}{\lambda}[I_n - K_{m+1} H_{m+1}]P_m$$

Where β(m) represents the estimated scalar β at time m, $\psi_m$, denotes the normalized lateral force calculated according to equation (32) at time m, $\delta_m$ denotes the vehicle steer angle measure at time $\hat{\beta}(m)$ represent an intermediate vector at time m, $H_m$ is an intermediate row vector at time m, $K_m$ is the estimator gain matrix at time m, and $P_m$ is the estimation error covariance matrix at time m. To improve the overall stability of the estimation, the RLSE calculation is only enabled when the following criteria are met:

$$V_{x,MIN} \leq V_x \leq V_{x,MAX}$$

$$\delta_{MIN} \leq \delta \leq \delta_{MAX}$$

$$r_{MIN} \leq r \leq r_{MAX}$$

$$a_{y,MIN} \leq a_y \leq a_{y,MAX} \qquad \text{eq. (38-41)}$$

in which $a_{y,MIN}$ and $a_{y,MAX}$ are predetermined minimum and maximum values of the lateral acceleration, $V_{x,MIN}$ and $V_{x,MAX}$ are predetermined minimum and maximum values of vehicle speed $V_x$; $\delta_{MIN}$ and $\delta_{MAX}$ are predetermined minimum and maximum values for steer angle δ; and $r_{MIN}$ and $r_{MAX}$ are predetermined minimum and maximum values of yaw rate r. Equations (38-41) help to ensure that the tires are operating in a desired linear range and that the vehicle is sufficiently excited to estimate β.

Specifically, the step S202 is implemented through a plurality of sub-steps as shown in FIG. 4. At sub-step S2021, it is checked whether the vehicle speed $V_x$, the vehicle steer angle δ, the measured yaw rate $r_{meas}$, and the lateral acceleration $a_y$ fulfill equations (38-41). If equations (38-41) are fulfilled, the method proceeds with the sub-step S2022; otherwise, the method goes back and starts again at the step S201. At sub-step S2022, the normalized lateral force ψ is calculated with the detected vehicle speed $V_x$, the yaw rate r, and the lateral acceleration $a_y$ according to equation (33). At sub-step S2023, the lookup value β is calculated with the aforementioned RLSE.

The final step, S203, is to use a lookup table to estimate μ from β. The lookup table is prepared experimentally beforehand based on the relationship between μ and β.

Figure 5:
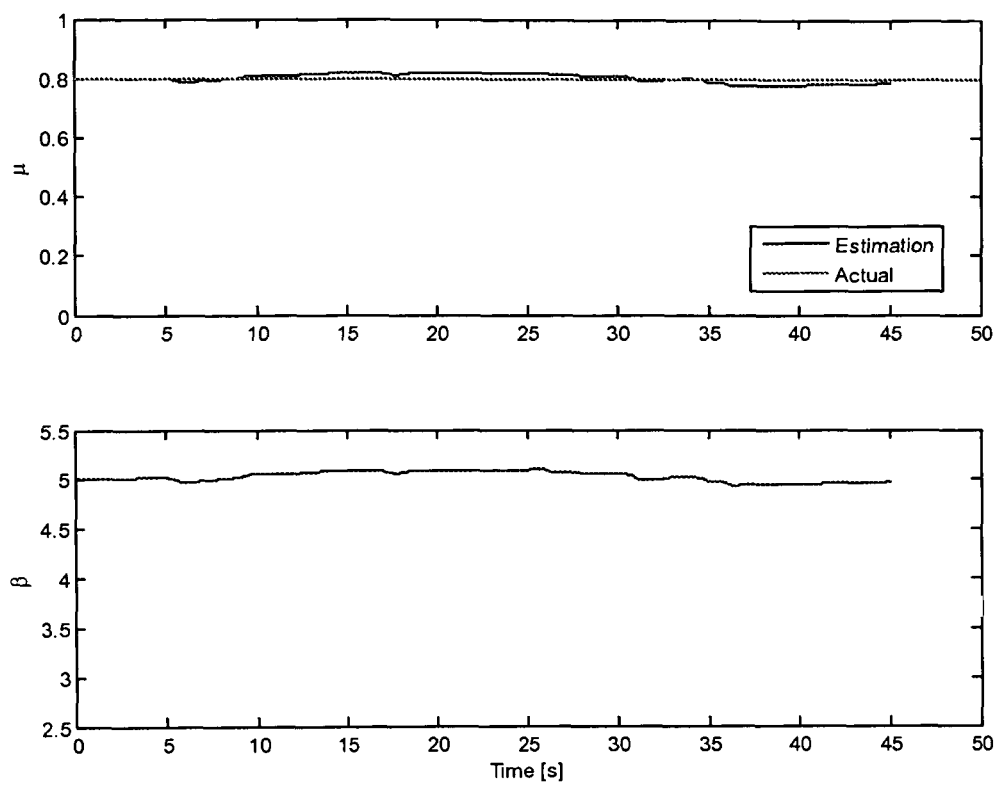
FIG. 5 shows the estimated values of $\mu$ and $\beta$ for a vehicle operating on a high $\mu$ (asphalt)
Figure 6:
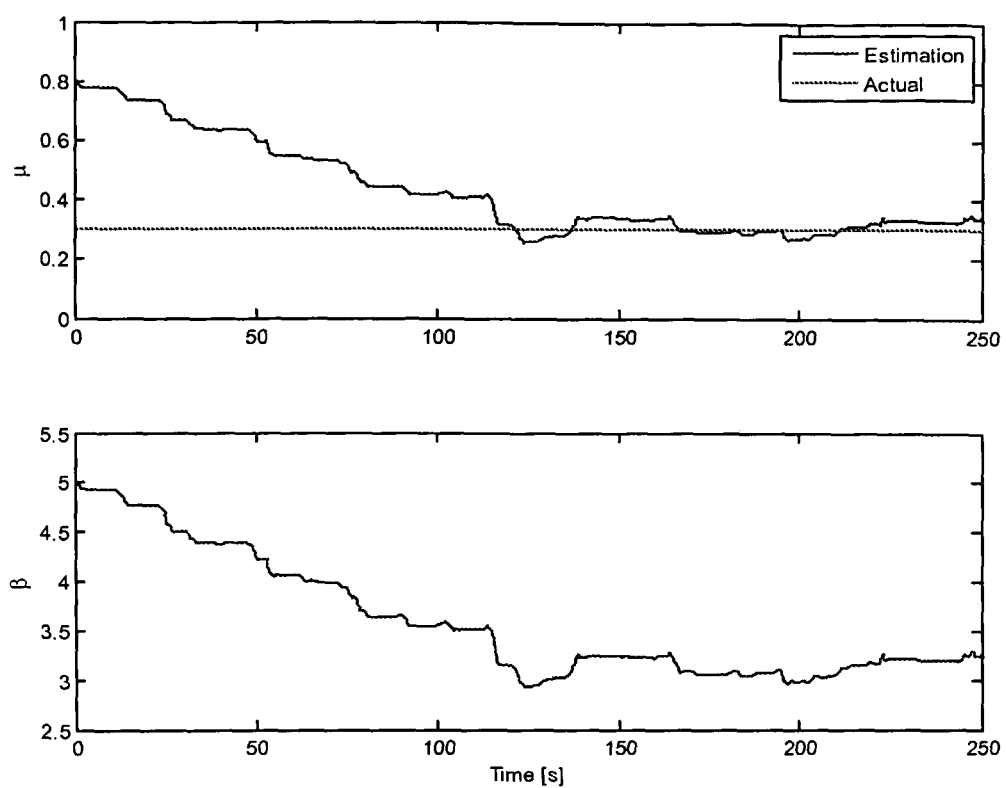
FIG. 6 shows the estimated values of $\mu$ and $\beta$ for the same vehicle as that in FIG. 5, which, however, operates on a low $\mu$ (snow) surface instead on a high $\mu$ surface.

The estimated values of μ and β for the same vehicle operating on both a high μ (asphalt) and a low μ (snow) surface are respectively shown in FIGS. 5 and 6. Again, using the disclosed estimation, μ is well estimated in high μ scenarios and the estimated value remains very close to the actual value. For low μ conditions, the estimated value of μ quickly approaches the actual value of μ. That is, because the recursive logic uses less memory than a batch type analysis, and because the equations are not computationally demanding to solve, μ is very well estimated within a reasonable time. In the above example, within about 125 seconds, β correlates well to the actual road surface friction coefficient.

The process for real time estimation of road surface friction coefficient disclosed above can be implemented in a vehicle and can be comprised in processing instructions in a computer readable device. Such a vehicle can have sensors and actuators distributed along the driveline, fuel system, power transmission, engine, wheels or axles as appropriate and the computer readable device can be part of a dashboard electronics system or other onboard computer system. Integrated chip computing systems are also contemplated. At a minimum, the device should have at least one of the following: RAM, ROM, Flash, DIMM or a non-transient equivalent. And the device should be compatible for access by a processor with at least one core.

While certain data and commands can be transmitted between the sensors, the CPU, and the remainder of the vehicle along circuitry such as a data BUS or wirelessly, the estimation programming and supporting data are to be stored in at least one tangible computer-readable memory device. The programming and data can be read out of the memory device and in to a processor. The data and the algorithm can be used in the processor to create processing results, which can be used for further processing and to control the vehicle. The processing results can be stored in the same or a different tangible memory device, especially when the program includes steps for applying the forgetting factor $\lambda$. And, while the collected data can be stored in the memory, it can also be streamed to the processor from the detectors.

Figure 7:
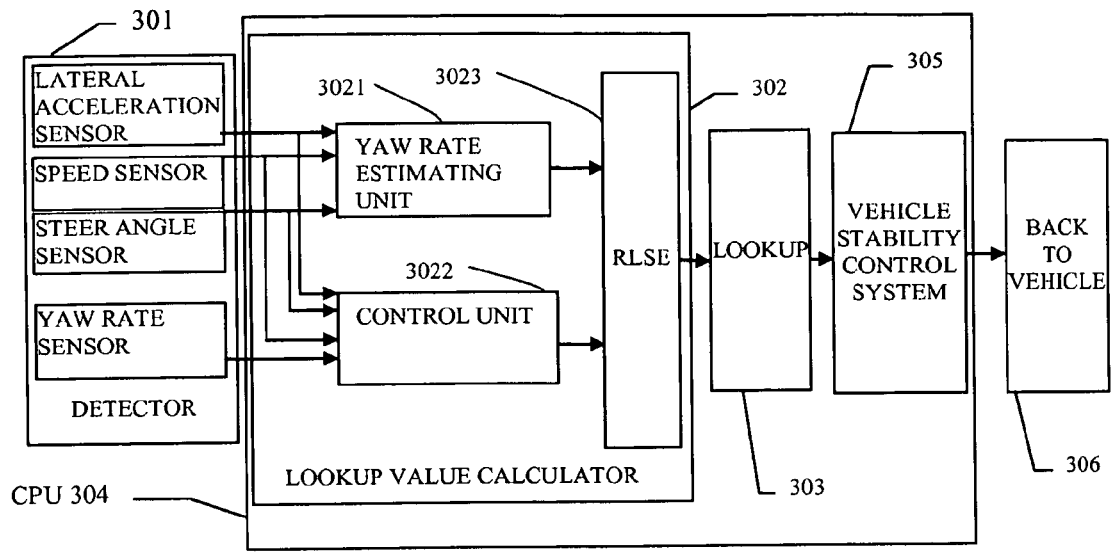
FIG. 7 illustrates an apparatus for real time estimation of road surface friction coefficient for vehicle stability control.

FIG. 7 illustrates an apparatus for real time estimation of road surface friction coefficient for vehicle stability control. The apparatus comprises a detector 301, a lookup value calculator 302, and a lookup 303. The detector may comprise at least one speed sensor, steer angle sensor, and yaw rate sensor, which are used to detect the vehicle speed, steer angle, yaw rate, and lateral acceleration in real time.

The sensors may comprise, for example, pressure sensors linked to the gas pedal, relative motion sensors linked to the tires or steering wheel, relative angle sensors on the vehicle frame or body, fuel consumption sensor in the fuel line, an RPM sensor in the engine, etc. The yaw and lateral acceleration can be sensed with an inertial measurement unit (IMU). Wheel speeds can be measured with hall effect sensors mounted on the ends of the axles. The steering angle can be measured using a sensor mounted to the steering column that measures the actual steering wheel angle. The speed sensor can comprise multiple wheel sensors, such that each wheel of a vehicle has its own sensor. For a passenger vehicle or pick-up truck, this means one wheel sensor for each of the four wheels. Vehicles with more than two wheels per axle, or more than two axles will require other arrangements.

Each sensor has appropriate electrical communication capabilities to transmit signals to the lookup value calculator 302, which can be a part of an on board computer or chip as CPU 304. CPU 304 can comprise at least circuitry, memory, and processor for storing the algorithms needed to process collected data and for storing and accessing the data needed to estimate CPU 304 can comprise or communicate with memory and processing allocations for vehicle stability control 305. That is, the memory can be shared or exclusive to each function of estimating or controlling, and likewise the processor can be exclusive or shared. Exclusivity would require additional hardware, while sharing would require appropriate allocation programming and circuitry. In either case, stored data and algorithms can be fed to a processor for computational processing.

Appropriate BUS or other circuitry can communicate with the lookup 303, which can comprise at least a computer data structure such as a look up table (LUT) in a memory. The lookup 303 can be part of the shared memory and processor of CPU 304, or the lookup 303 can be associated with an exclusive memory and processor.

The lookup value calculator 302 calculates a lookup value $\alpha$ as defined above in equations (1) and (2). The calculator may comprise three units, namely, a yaw rate estimating unit 3021, a control unit 3022, and a RLSE unit 3023. The yaw rate estimating unit 3021 is connected to the speed sensors and the steer angle sensor of the detector 301, and receives the vehicle speed $V_x$ and vehicle steer angle $\delta$ detected by the sensors and calculates the estimated yaw rate $r_{EST}$ according to the aforementioned equation (2). The control unit 3022 is connected to the speed sensors, steer angle sensor, and yaw rate sensor and may receive the vehicle speed $V_x$, steer angle $\delta$, yaw rate r, and lateral acceleration $a_y$ detected by the sensors. The unit 3022 stores predetermined values of $V_{x,\,MIN}$, $V_{x,\,MAX}$, $\delta_{MIN}$, $\delta_{MAX}$, $r_{MIN}$, $r_{MAX}$, $a_{y,\,MIN}$ and $a_{y,\,MAX}$ and may compare $V_x$, $\delta$, $r_{MEAS}$, and $a_y$ to these values respectively to check whether $V_x$, $\delta$, $r_{MEAS}$, and $a_y$ fulfill the above equations (28-31). If equations (28-31) are fulfilled, the control unit 3022 issues an enabling signal to the RLSE unit 3023 to enable RLSE calculation. The RLSE unit 3023 is connected to the yaw rate estimating unit and the control unit; it can receive the estimated yaw rate $r_{EST}$ calculated by the yaw rate estimating unit 3021 and can receive the detected yaw rate $r_{MEAS}$ as well as the enabling signal from the control unit 3022. Upon receiving an enabling signal from the control unit 3022, the RLSE unit 3023 will calculate the lookup value $\alpha$ with RLSE according to the aforementioned equations (24-27).

The lookup 303 uses a lookup table to estimate $\mu$ from $\alpha$. The lookup table is prepared experimentally beforehand based on the relationship between $\mu$ and $\alpha$. The lookup table is stored in a memory device for interaction with a processor.

Once $\mu$ is estimated, $\mu$ can be used in the vehicle stability control system 305, which is configured to calculate and implement vehicle adjustments such as yaw control parameters. The vehicle 306 can receive instructions from vehicle stability control system 305 to correct yaw. Other corrections may be implemented for oversteer, understeer or ABS (antilock brakes).

Figure 8:
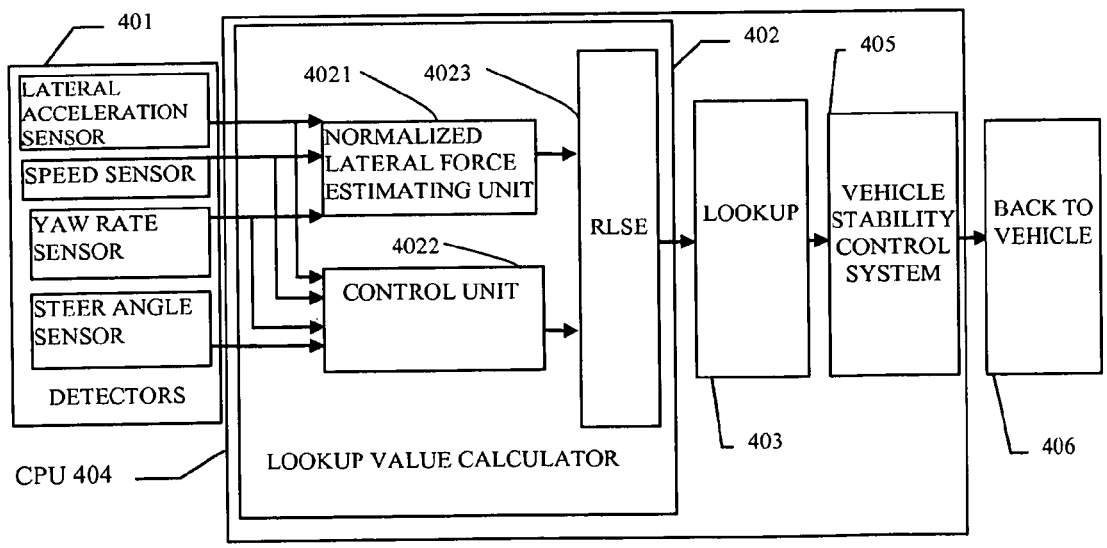
FIG. 8 illustrates another apparatus for real time estimation of road surface friction coefficient for vehicle stability control.

FIG. 8 illustrates another apparatus for real time estimation of road surface friction coefficient for vehicle stability control. Similar as above, the apparatus comprises a detector 401, a lookup value calculator 402, and a lookup 403. The detector may comprise speed sensor, steer angle sensor, yaw rate sensor, and lateral acceleration sensor, which are used to detect, respectively, the speed, steer angle, yaw rate, and lateral acceleration of a vehicle in real time. As above, the speed sensor can comprise multiple wheel sensors, as appropriate for the vehicle type.

As above, the sensors may comprise, for example, pressure sensors linked to the gas pedal, relative motion sensors linked to the tires or steering wheel, relative angle sensors on the vehicle frame or body, fuel consumption sensor in the fuel line, an RPM sensor in the engine, etc. As additional examples, the yaw and lateral acceleration can be sensed with an inertial measurement unit (IMU); wheel speeds can be measured with hall effect sensors mounted on the ends of the axles; and the steering angle can be measured using a sensor mounted to the steering column that measures the actual steering wheel angle.

Each sensor has appropriate electrical communication capabilities to transmit signals to the lookup value calculator 402, which can be a part of an on board computer or chip as CPU 404. CPU 404 can comprise at least circuitry, memory, and processor for storing the algorithms needed to process collected data and for storing and accessing the data needed to estimate $\beta$. CPU 404 can comprise or communicate with memory and processing allocations for vehicle stability control 405. That is, the memory can be shared or exclusive to each function of estimating or controlling, and likewise the processor can be exclusive or shared. Exclusivity would require additional hardware, while sharing would require appropriate allocation programming. In either case, stored data and algorithms can be fed to a processor for computational processing.

Appropriate BUS or other circuitry can communicate with the lookup 403, which can comprise a computer data structure such as a look up table (LUT) in a memory. The lookup 403 can be a part of the shared memory and processor of CPU 404, or lookup 403 can comprise an exclusive memory and processor.

The lookup value calculator 402 calculates the lookup value β as defined above in equations (32) and (33). The calculator may comprise three units, namely, a normalized lateral force estimating unit 4021, a control unit 4022, and a RLSE unit 4023. The estimating unit 4021 receives the vehicle speed $V_x$, yaw rate $r_{MEAS}$, and lateral acceleration $a_y$ of a vehicle detected by the sensors of the detector and calculates the normalized lateral force ψ according to equation (33). The control unit 4022 is connected to the speed sensors, the steer angle sensor, the yaw rate sensor, and the lateral acceleration sensor, and may receive the vehicle speed $V_x$, steer angle δ, yaw rate $r_{MEAS}$, and lateral acceleration $a_y$ detected by the sensors. The unit 4022 stores predetermined values of $V_{x,MIN}$, $V_{x,MAX}$, $\delta_{MIN}$, $\delta_{MAX}$, $r_{MIN}$, $r_{MAX}$, $a_{y,MIN}$, and $a_{x,MAX}$, and may compare $V_x$, δ, $r_{MEAS}$, and $a_y$ to these values respectively to check whether $V_x$, δ, $r_{MEAS}$, and $a_y$ fulfill the above equations (38-41). If equations (38-41) are fulfilled, the control unit 4022 issues an enabling signal to the RLSE unit 4023 to enable RLSE calculation. The RLSE unit 4023 is connected to the normalized lateral force estimating unit 4021 and the control unit 4022, it can receive the normalized lateral force ψ calculated by the unit 4021 and can receive the detected steer angle δ as well as the enabling signal from the control unit 4022. Upon receiving an enabling signal from the control unit 4022, the RLSE unit 4023 will calculate the lookup value β with RLSE according to the aforementioned equations (34-37).

The lookup 403 uses a lookup table to estimate μ from β. The lookup table is prepared experimentally beforehand based on the relationship between μ and β. The lookup table is stored in a memory device for interaction with a processor.

Once β is estimated, β can be used in the vehicle stability control system 405, which is configured to calculate and implement vehicle adjustments such as yaw control parameters. The vehicle 406 can receive instructions from vehicle stability control system 405 to correct yaw. Other corrections may be implemented for oversteer, understeer or ABS (antilock brakes).

In the preceding specification, various teachings have been described with reference to the accompanying drawings. It will, however, be evident that various other modifications and changes may be made thereto, without departing from the broader scope of the claims that follow. The specification and drawings are accordingly to be regarded in an illustrative rather than restrictive sense.

For instance, in the first and second methods described above, the lookup value is set to be, respectively, α (partial derivative of the measured yaw rate over an estimated yaw rate) or β (the partial derivative of the normalized lateral forces on the front and rear tires over the vehicle steer angle), while other lookup values can also be used, for example, the lateral acceleration.

Other embodiments will be apparent to those skilled in the art from consideration of the specification and practice of the teachings disclosed herein. It is intended that the specification and examples be considered as exemplary only, with the true scope and spirit of the invention being indicated by the following claims.

We claim:

1. A non-transitory computer-readable storage media comprising stored programming configured for processing by a processor, the programming, when executed by a processor, comprising instructions to:

receive vehicle parameters derived from data collected by sensors on a driveline of a vehicle, the vehicle parameters comprising at least a vehicle speed $V_x$, a steer angle δ, a yaw rate r, and a lateral acceleration $a_y$;

calculate a lookup value based on the detected vehicle parameters, the calculating comprising a recursive least square estimation;

retrieve a road surface friction coefficient from a lookup table by matching the calculated lookup value to the road surface friction coefficient stored in the lookup table;

calculate adjustments to the vehicle using the road surface friction coefficient; and output the adjustments to a vehicle control system for execution, wherein the recursive least square estimation is enabled only when the following enabling criteria are met:

$V_{x,MIN} \leq V_x \leq V_{x,MAX}$, $\delta_{MIN} \leq \delta \leq \delta_{MAX}$, $r_{MIN} \leq r \leq r_{MAX}$, and $a_{y,MIN} \leq a_y \leq a_{y,MAX}$, in which $V_{x,MIN}$ and $V_{x,max}$ are predetermined minimum and maximum values of the vehicle speed, $\delta_{MIN}$ and $\delta_{MAX}$ are predetermined minimum and maximum values for the steer angle, $r_{MIN}$ and $r_{MAX}$ are predetermined minimum and maximum values of the yaw rate, and $a_{y,MIN}$ and $a_{y,MAX}$ are predetermined minimum and maximum values of the lateral acceleration.

2. The non-transitory computer-readable storage media of claim 1, wherein the lookup value, α, is a partial derivative of the measured yaw rate over an estimated yaw rate $r_{EST}$, and the estimated yaw rate $r_{EST}$ is calculated according to the equation $$r_{EST} = V_x \delta \left( L + \frac{k_{us} V_x^2}{g} \right),$$

in which L is wheelbase length, $k_{us}$ is a vehicle understeer gradient, and g is a gravitational constant.

3. The non-transitory computer-readable storage media of claim 2, wherein the programming further comprises instructions to calculate the estimated yaw rate $r_{EST}$ when the enabling criteria are met, and to reiterate receiving vehicle parameters from the vehicle when the enabling criteria are not met.

4. The non-transitory computer-readable storage media of claim 2, wherein calculating the lookup value further comprises an exponential forgetting factor.

5. The non-transitory computer-readable storage media of claim 4, wherein calculating the lookup value is performed in accordance with:

$$\alpha(m+1) = [1 \ 0] \cdot (\hat{\alpha}(m) + K_{m+1}(r_{MEAS,m+1} - H_{m+1}\hat{\alpha}(m))),$$

$$H_{m+1} = [r_{EST,m+1} \ 1],$$

$$K_{m+1} = P_m H'_{m+1}(H_{m+1} P_m H'_{m+1} + \lambda)^{-1},$$

and $$P_{m+1} = \frac{1}{\lambda}[I_n - K_{m+1} H_{m+1}] P_m,$$

in which α(m) represents an estimated α at time m, λ is the exponential forgetting factor, $r_{MEAS,m}$ denotes a yaw rate measured at time m, $r_{EST,m}$ denotes a yaw rate estimated at time m, $\hat{\alpha}(m)$ represent an intermediate vector at time m, $H_m$ is an intermediate row vector at time m, $K_m$ is an estimator gain matrix at time m, and $P_m$ is an estimation error covariance matrix at time m.

6. The non-transitory computer-readable storage media of claim 1, wherein the lookup value, β, is calculated using instructions for calculating a partial derivative of a normalized lateral force ψ on front and rear tires over the vehicle steer angle, and the normalized lateral force ψ is calculated according to the equation:

$$\psi = \frac{F_f + F_r}{V_x} = \frac{ma_y + V_x mr}{V_x},$$

in which m is a mass of the vehicle, $F_f$ is front tire lateral force, and $F_r$ is rear tire lateral force.

7. The non-transitory computer-readable storage media of claim 6, wherein the programming for calculating the lookup value further comprises instructions to calculate the normalized lateral force when the enabling criteria are met, and to reiterate receiving detected vehicle parameters from the vehicle when the enabling criteria are not met.

8. The non-transitory computer-readable storage media of claim 6, wherein calculating a lookup value further comprises an exponential forgetting factor.

9. The non-transitory computer-readable storage media of claim 8, wherein the recursive least square estimation with exponential forgetting factor is performed in accordance with:

$$\beta(m+1) = [1\ 0] \cdot \left(\hat{\beta}(m) + K_{m+1}(\psi_{m+1} - H_{m+1}\hat{\beta}(m))\right),$$

$$H_{m+1} = [\delta_{m+1}\ 1],$$

$$K_{m+1} = P_m H'_{m+1}(H_{m+1} P_m H'_{m+1} + \lambda)^{-1},$$

and $$P_{m+1} = \frac{1}{\lambda}[I_n - K_{m+1} H_{m+1}] P_m,$$

in which β(m) represents an estimated β at time m, λ is the exponential forgetting factor, $\psi_m$ denotes a normalized lateral force calculated at time m, $\delta_m$ denotes a vehicle steer angle measure at time m, $\hat{\beta}(m)$ represents an intermediate vector at time m, $H_m$ is an intermediate row vector at time m, $K_m$ is an estimator gain matrix at time m, and $P_m$ is an estimation error covariance matrix at time m.

10. An apparatus for estimation of a road surface friction coefficient for vehicle stability control, comprising:

a vehicle stability control system comprising at least one of brake force actuators and torque control actuators;

sensors for detecting data for deriving vehicle operating parameters, the sensors comprising at least a speed sensor for detecting vehicle speed $V_x$, a steer angle sensor for detecting vehicle steer angle δ, a yaw rate sensor for detecting yaw rate r, and a lateral acceleration sensor for detecting lateral acceleration $a_y$;

at least one non-transitory memory device storing programming for estimating a road surface friction coefficient, the programming comprising processor-executable instructions to:

determine whether the following enabling criteria are met:

$V_{x,MIN} \leq V_x \leq V_{x,MAX}$, $\delta_{MIN} \leq \delta \leq \delta_{MAX}$, $r_{MIN} \leq r \leq r_{MAX}$, and $a_{y,MIN} \leq a_y \leq a_{y,MAX}$, in which $V_{x,MIN}$, and $V_{x,max}$ are predetermined minimum and maximum values of vehicle speed, $\delta_{MIN}$ and $\delta_{MAX}$ are predetermined minimum and maximum values for steer angle, $r_{MIN}$ and $r_{MAX}$ are predetermined minimum and maximum values of yaw rate, and $a_{y,MIN}$ and $a_{y,MIN}$ are predetermined minimum and maximum values of the lateral acceleration;

when the enabling criteria are met, calculate a lookup value based on the vehicle parameters and an recursive least square estimation;

retrieve a road surface friction coefficient from a stored lookup table by matching the calculated lookup value to the road surface friction coefficient;

calculate adjustments to the vehicle using the road surface friction coefficient; and output the adjustments to the vehicle control system for implementation; and at least one processor in communication with the sensors and the at least one memory device, the at least one processor configured to:

receive and execute the instructions; and receive the detected vehicle parameters, wherein, when the adjustments are output to the vehicle control system for implementation, the actuators adjust the at least one brake force actuators or torque control actuators.

11. The apparatus according to claim 10, wherein the lookup value, α is calculated utilizing instructions for calculating a partial derivative of the measured yaw rate over an estimated yaw rate $r_{EST}$, and the estimated yaw rate $r_{EST}$ is calculated according to the equation $$r_{EST} = V_x \delta \bigg/ \left(L + \frac{k_{us} V_x^2}{g}\right),$$

in which L is a wheelbase length, $k_{us}$ is a vehicle understeer gradient, and g is a gravitational constant.

12. The apparatus according to claim 11, further comprising a yaw rate estimating unit, a control unit, and a recursive least squares estimation (RLSE) unit, wherein the yaw rate estimating unit:

is connected to the speed sensor and steer angle sensor, receives the vehicle speed and steer angle detected by the sensors, and calculates an estimated yaw rate according to the equation $$r_{EST} = V_x \delta \bigg/ \left(L + \frac{k_{us} V_x^2}{g}\right),$$

wherein the control unit:
is connected to the speed sensor, steer angle sensor, and yaw rate sensor,
receives the vehicle speed $V_x$, steer angle $\delta$, and yaw rate $r_{MEAS}$,
checks if the enabling criteria are met and
when the enabling criteria are met, issues an enabling signal to the RLSE unit to enable the recursive least square estimation, and wherein the RLSE unit:
is connected to the yaw rate estimating unit and the control unit,
receives the estimated yaw rate calculated by the yaw rate estimating unit,
receives the measured yaw rate as well as the enabling signal from the control unit, and
upon receiving an enabling signal from the control unit, the RLSE unit calculates the lookup value with the recursive least square estimation.

13. The apparatus according to claim 12, wherein the RLSE unit further calculates the lookup value using an exponential forgetting factor.

14. The apparatus according to claim 13, wherein the recursive least square estimation is executed with the exponential forgetting factor in accordance the equations:

$$\alpha(m+1) = [1\ 0] \cdot (\hat{\alpha}(m) + K_{m+1}(r_{MEAS,m+1} - H_{m+1}\hat{\alpha}(m))),$$

$$H_{m+1} = [r_{EST,m+1}\ 1],$$

$$K_{m+1} = P_m H'_{m+1}(H_{m+1} P_m H'_{m+1} + \lambda)^{-1},$$

and $$P_{m+1} = \frac{1}{\lambda}[I_n - K_{m+1}H_{m+1}]P_m,$$

in which $\alpha(m)$ represents an estimated $\alpha$ at time m, $\lambda$ is the exponential forgetting factor, $r_{MEAS,m}$ denotes a yaw rate measured at time m, $r_{EST,m}$ denotes a yaw rate estimated at time m, $\hat{\alpha}(m)$ represent an intermediate vector at time m, $H_m$ is an intermediate row vector at time m, $K_m$ is an estimator gain matrix at time m, and $P_m$ is an estimation error covariance matrix at time m.

15. The apparatus according to claim 10, wherein the lookup value, $\beta$, is calculated utilizing instructions for calculating a partial derivative of a normalized lateral force $\psi$ on front and rear tires over vehicle steer angle, and
the normalized lateral force $\psi$ is calculated according to the equation $$\psi = \frac{F_f + F_r}{V_x} = \frac{ma_y + V_x mr}{V_x},$$

in which m is the mass of the vehicle, $F_f$ is front tire lateral force, and $F_r$ is rear tire lateral force.

16. The apparatus according to claim 15, wherein the apparatus further comprises a normalized lateral force estimating unit, a control unit, and a recursive least squares estimation (RLSE) unit,
wherein the normalized lateral force estimating unit:
is connected to the speed sensor, yaw rate sensor, and lateral acceleration sensor,
receives the vehicle speed, yaw rate, and lateral acceleration, and calculates the normalized later force $\psi$ according to the equation $$\psi = \frac{F_f + F_r}{V_x} = \frac{ma_y + V_x mr}{V_x},$$

wherein the control unit:
is connected to the speed sensor, steer angle sensor, yaw rate sensor, and steer angle sensor,
receives the vehicle speed $V_x$, steer angle $\delta$, yaw rate $r_{MEAS}$, and lateral acceleration $a_y$, and
checks if the enabling criteria are met, and
when the enabling criteria are met, issues an enabling signal to the RLSE unit to enable recursive least square estimation,
wherein the RLSE unit:
is connected to the normalized lateral force estimating unit and the control unit,
receives the normalized lateral force calculated by the normalized lateral force estimating unit, and
receives the steer angle $\delta$ as well as the enabling signal from the control unit, and upon receiving an enabling signal from the control unit, the RLSE unit calculates the lookup value with the recursive least square estimation.

17. The apparatus according to claim 16, wherein the RLSE unit calculates the lookup value based on the detected vehicle parameters using the recursive least square estimation and an exponential forgetting factor.

18. The apparatus according to claim 17, wherein the recursive least square estimation and exponential forgetting factor are in accordance the with equations:

$$\beta(m+1) = [1\ 0] \cdot (\hat{\beta}(m) + K_{m+1}(\psi_{m+1} - H_{m+1}\hat{\beta}(m))),$$

$$H_{m+1} = [\delta_{m+1}\ 1],$$

$$K_{m+1} = P_m H'_{m+1}(H_{m+1} P_m H'_{m+1} + \lambda)^{-1},$$

and $$P_{m+1} = \frac{1}{\lambda}[I_n - K_{m+1}H_{m+1}]P_m,$$

in which $\beta(m)$ represents an estimated $\beta$ at time m, $\lambda$ is the exponential forgetting factor, $\psi_m$ denotes a normalized lateral force calculated at time m, $\delta_m$ denotes a vehicle steer angle measure at time m, $\hat{\beta}(m)$ represent an intermediate vector at time m, $H_m$ is an intermediate row vector at time m, $K_m$ is an estimator gain matrix at time m, and $P_m$ is an estimation error covariance matrix at time m.

19. An apparatus for estimation of a road surface friction coefficient for vehicle stability control, comprising:
a vehicle stability control system comprising at least one of brake force actuators and torque control actuators;
sensors for detecting data for deriving vehicle operating parameters, the operating parameters comprising at least a vehicle speed $V_x$, a steer angle $\delta$, a yaw rate r, and a lateral acceleration $a_y$;
at least one non-transitory memory device storing programming for estimating a road surface friction coefficient, the programming comprising processor-executable instructions to:
calculate a lookup value based on the vehicle operating parameters and an recursive least square estimation, wherein the lookup value is calculated utilizing instructions for calculating a partial derivative of the measured yaw rate over an estimated yaw rate $r_{EST}$, and the estimated yaw rate $r_{EST}$ is calculated according to the equation:

$$r_{EST} = V_x \delta \left( L + \frac{k_{us} V_x^2}{g} \right),$$

in which L is a wheelbase length, $k_{us}$ is a vehicle understeer gradient, and g is a gravitational constant;
retrieve a road surface friction coefficient from a stored lookup table by matching the calculated lookup value to the road surface friction coefficient;
calculate adjustments to the vehicle using the road surface friction coefficient; and
output the adjustments to the vehicle control system for implementation; and
at least one processor in communication with the sensors and the at least one memory device, the at least one processor configured to:
receive and execute the instructions; and
receive the detected vehicle operating parameters,
wherein, when the adjustments are output to the vehicle control system for implementation, the actuators adjust the at least one brake force actuators or torque control actuators.

20. The apparatus of claim 19, further comprising a yaw rate estimating unit, a control unit, and a recursive least squares estimation (RLSE) unit,
wherein the yaw rate estimating unit:
is connected to receive the vehicle speed and steer angle vehicle operating parameters, and
calculates the estimated yaw rate according to the equation $$r_{EST} = V_x \delta \left( L + \frac{k_{us} V_x^2}{g} \right),$$

wherein the control unit:
is connected to receive the vehicle speed $V_x$, steer angle $\delta$, and yaw rate $r_{MEAS}$ vehicle operating parameters,
checks if the following enabling criteria are met:

$V_{x,MIN} \leq V_x \leq V_{x,MAX}$, $\delta_{MIN} \leq \delta \leq \delta_{MAX}$, $r_{MIN} \leq r \leq r_{MAX}$, and $a_{y,MIN} \leq a_y \leq a_{y,MAX}$, in which $V_{xMIN}$ and $V_{x,max}$ are predetermined minimum and maximum values of vehicle speed, $\delta_{MIN}$ and $\delta_{MAX}$ are predetermined minimum and maximum values for steer angle, $r_{MIN}$ and $r_{MAX}$ are predetermined minimum and maximum values of yaw rate, and $a_{y,MIN}$ and $a_{y,MAX}$ are predetermined minimum and maximum values of the lateral acceleration, and
when the enabling criteria are met, issues an enabling signal to the RLSE unit enable the recursive least square estimation, and
wherein the RLSE unit:
is connected to the yaw rate estimating unit and the control unit,
receives the estimated yaw rate calculated by the yaw rate estimating unit,
receives the measured yaw rate as well as the enabling signal from the control unit, and
upon receiving an enabling signal from the control unit, the RLSE unit calculates the lookup value with the recursive least square estimation.

21. An apparatus for estimation of a road surface friction coefficient for vehicle stability control, comprising:
a vehicle stability control system comprising at least one of brake force actuators and torque control actuators;
sensors for detecting data for deriving vehicle operating parameters, the vehicle operating parameters comprising at least a vehicle speed $V_x$, a vehicle steer angle $\delta$, a yaw rate r, and a lateral acceleration $a_y$;
at least one non-transitory memory device storing programming for estimating a road surface friction coefficient, the programming comprising processor-executable instructions to:
calculate a lookup value based on the vehicle operating parameters and an recursive least square estimation, wherein the lookup value is calculated utilizing instructions for calculating a partial derivative of a normalized lateral force $\psi$ on front and rear tires over vehicle steer angle, and the normalized lateral force $\psi$, is calculated according to the equation $$\psi = \frac{F_f + F_r}{V_x} = \frac{m a_y + V_x m r}{V_x},$$

in which m is the mass of the vehicle, Ff is front tire lateral force, and Fr is rear tire lateral force;
retrieve a road surface friction coefficient from a stored lookup table by matching the calculated lookup value to the road surface friction coefficient;
calculate adjustments to the vehicle using the road surface friction coefficient; and
output the adjustments to the vehicle control system for implementation; and
at least one processor in communication with the sensors and the at least one memory device, the at least one processor configured to:
receive and execute the instructions; and
receive the vehicle operating parameters,
wherein, when the adjustments are output to the vehicle control system for implementation, the actuators adjust the at least one brake force actuators or torque control actuators.

22. The apparatus according to claim 21, wherein the apparatus further comprises a normalized lateral force estimating unit, a control unit, and a recursive least squares estimation (RLSE) unit,
wherein the normalized lateral force estimating unit:
is connected to receive the vehicle speed, yaw rate, and lateral acceleration vehicle operating parameters, and
calculates the normalized later force $\psi$ according to the equation $$\psi = \frac{F_f + F_r}{V_x} = \frac{m a_y + V_x m r}{V_x},$$

wherein the control unit:
is connected to receive the vehicle speed $V_x$, steer angle $\delta$, yaw rate $r_{MEAS}$ and lateral acceleration $a_y$ vehicle operating parameters,
checks if the following enabling criteria are met:

$V_{x,MIN} \leq V_x \leq V_{x,MAX}$, $\delta_{MIN} \leq \delta \leq \delta_{MAX}$, $r_{MIN} \leq r \leq r_{MAX}$, and $a_{y,MIN} \leq a_y \leq a_{y,MAX}$, in which $V_{xMIN}$ and $V_{x,max}$ are predetermined minimum and maximum values of vehicle speed, $\delta_{MIN}$ and $\delta_{MAX}$ are predetermined minimum and maximum values for steer angle, $r_{MIN}$ and $r_{MAX}$ are predetermined minimum and maximum values of yaw rate, and $a_{y,MIN}$ and $a_{y,MAX}$ are predetermined minimum and maximum values of the lateral acceleration, and when the enabling criteria are met, issues an enabling signal to the RLSE unit to enable recursive least square estimation, and wherein the RLSE unit:

is connected to the normalized lateral force estimating unit and the control unit, receives the normalized lateral force calculated by the normalized lateral force estimating unit, and receives the steer angle δ as well as the enabling signal from the control unit, and upon receiving an enabling signal from the control unit, the RLSE unit calculates the lookup value with the recursive least square estimation.

* * * * *